(12) United States Patent  (10) Patent No.: US 8,159,397 B2
Feller et al.  (45) Date of Patent: Apr. 17, 2012

(54) SYSTEM FOR DETERMINING POSITION USING TWO WAY TIME TRANSFER SIGNALS

(75) Inventors: Walter J. Feller, Airdrie (CA); Patrick C. Fenton, Calgary (CA)

(73) Assignee: NovAtel Inc., Calgary (CA)

( * ) Notice: Subject to any disclaimer, the term of this patent is extended or adjusted under 35 U.S.C. 154(b) by 202 days.

(21) Appl. No.: 12/640,493

(22) Filed: Dec. 17, 2009

(65) Prior Publication Data

US 2010/0149032 A1    Jun. 17, 2010

Related U.S. Application Data

(63) Continuation-in-part of application No. 11/694,368, filed on Mar. 30, 2007, now Pat. No. 7,656,349.

(60) Provisional application No. 60/787,428, filed on Mar. 30, 2006.

(51) Int. Cl.
    G01S 3/02    (2006.01)
(52) U.S. Cl. ......................................... 342/458
(58) Field of Classification Search ................... 342/458
    See application file for complete search history.

(56) References Cited

U.S. PATENT DOCUMENTS

| 3,742,498 | A | | 6/1973 | Dunn |
| 5,786,773 | A | | 7/1998 | Murphy |
| 5,818,385 | A | * | 10/1998 | Bartholomew ............... 342/372 |
| 6,212,475 | B1 | | 4/2001 | France et al. |
| 6,256,507 | B1 | * | 7/2001 | Lemieux ....................... 455/502 |
| 6,556,942 | B1 | | 4/2003 | Smith |
| 6,560,535 | B2 | | 5/2003 | Hohman et al. |
| 6,906,830 | B1 | * | 6/2005 | Hayashi ....................... 358/474 |
| 7,405,694 | B1 | | 7/2008 | Hwang et al. |
| 7,511,667 | B2 | | 3/2009 | Matsuoka et al. |
| 7,576,690 | B2 | | 8/2009 | Vollath |
| 2003/0058163 | A1 | | 3/2003 | Zimmerman et al. |
| 2003/0085839 | A1 | | 5/2003 | Zhodzishky et al. |
| 2004/0130485 | A1 | | 7/2004 | Rapoport et al. |
| 2007/0241960 | A1 | | 10/2007 | Feller |

FOREIGN PATENT DOCUMENTS

| EP | 0747721 | 12/1996 |
| GB | 2353648 | 2/2001 |
| WO | WO 97/28455 | 8/1997 |
| WO | WO 99/48233 | 9/1999 |

* cited by examiner

Primary Examiner — Harry Liu
(74) Attorney, Agent, or Firm — Cesari and McKenna, LLP; Patricia A. Sheehan

(57) ABSTRACT

A system for enhancing location estimates by movable rovers including one or more base stations that engage in two way time transfer (TWTT) with the rovers. Each TWTT operation between a given base station and a given rover provides range measurements and clock differences between the base station and rover. The range measurements are based on the travel time of return TWTT signals and the clock differences are based on a phase offset of a code in the return TWTT signal and/or timing information included in the return TWTT signals.

25 Claims, 3 Drawing Sheets

SYSTEM FOR DETERMINING POSITION USING TWO WAY TIME TRANSFER SIGNALS

CROSS-REFERENCE TO RELATED APPLICATIONS

The present application is a continuation-in-part application of U.S. patent application Ser. No. 11/694,368, which was filed on Mar. 30, 2007, now U.S. Pat. No. 7,656,349, which claims the benefit of U.S. Provisional Patent Application Ser. No. 60/787,428, which was filed on Mar. 30, 2006, by Walter J. Feller for ENHANCEMENT OF GPS POSITION DETERMINATION IN POOR SIGNAL PROPAGATION ENVIRONMENTS and is hereby incorporated by reference.

BACKGROUND OF THE INVENTION

1. Field of the Invention

This invention relates generally to GNSS systems and, in particular, to an improvement in position information acquired by a movable GNSS receiver.

2. Background Information

In the following description the term "rover" is applied to moveable receivers, whether they are attached to moving rovers or are otherwise moved about from time to time.

In some applications it is desirable for rovers to monitor their positions and this is usually accomplished by receivers, e.g., GPS or GLONASS receivers, which calculate their positions by means of ranging signals transmitted by earth-orbiting satellites. To provide a position determination in three coordinates, a receiver must receive ranging signals from four satellites, preferably more, to lessen the errors due to noise and multi-path distortion. With signals from four satellites, the receiver can calculate the ranging system's time at its location and also its position in three coordinates.

At times a rover may enter an area where trees and/or various other objects impede the signal reception from some of the satellites, thus degrading the accuracy of position determination. Various arrangements have been used to cope with this problem in automobiles, for example, but these solutions are not suitable for some small rovers, such as golf carts moving over golf courses because of, for example, associated costs and complexities. The present invention deals with these situations.

SUMMARY OF THE INVENTION

The following description refers specifically to GPS satellites. However, it is equally applicable to other satellite position-locating systems. In an arrangement incorporating the invention, a fixed base station, which has a known position, broadcasts to the rovers an RF signal that is modulated with a pseudo-random code having a similar length and chip rate as the ranging signals transmitted by the satellites, but having a different sequence from that used by any of the satellites. This signal is timed according to GPS time at the base station, and is thus another ranging signal for the rover. The base station may transmit over a portion of the frequency spectrum that does not require a license, e.g. the ISM (Industrial/Scientific and Medical) bands, and the transmission preferably has a bandwidth at least as wide as the bandwidth of GPS transmissions. The base station and rovers may also or instead transmit and receive wider baseband radio signals, such as WiFi (OFDM) and Ultra Wide Band (UWB) signals, for increased accuracy and a reduction in the adverse effects of multipath signals. In addition, other data, such as area maps, voice and so forth may be transmitted between the base station and the rover, between others and the base and/or the rovers, or rover to rover, as appropriate, for use with the timing and position information.

Each rover receives the ranging signal from the base station and aligns its code generator and carrier phase with that signal. If a rover can process signals from only three satellites, the base station serves as a ranging transmitter which is synchronous with the satellite system and, thus, serves as the required fourth satellite for a complete determination of the rover's position. Even if the rover can process the signals from four or more orbiting satellites, signals from the base station enhance the rover's position determinations, as set forth hereinafter.

If a rover can receive useful signals from only two satellites, the base station can calculate its range to the rover by comparing the timing of its transmission with the timing of a return signal from the rover. The base station then transmits this information to the rover by, for example, modulation of the ranging signal broadcast by the base station. Further, the GPS time at the rover's position can be determined by Two-Way-Time-Transfer (TWTT) between the rover and the base station. The rover thus has enough parameters to calculate its position.

If the rover receives usable information from only a single satellite, a somewhat less accurate estimate of the rover's position can be obtained by ascertaining the intersection of a sphere centered on the satellite with a radius equal to the calculated range between the rover and the satellite, i.e. the measured pseudorange adjusted in accord with the rover's estimate of its clock error (as determined by the use of TWTT), and the horizontal circle centered at the base station with radius equal to the calculated range between the base station and the rover. The ambiguity between the two possible intersecting points can be resolved by using the estimate of the rover's direction from the base station (calculated from the phase differences in the antennas used for receipt of transmissions from the rover), or the closer point to the last computed position of the rover.

The base station also broadcasts in its transmissions information about the GPS (or like) satellite signals, including identification of the satellites within its view, Doppler offsets of the signals from those satellites, messages transmitted by the satellites and other information that may be useful in processing satellite signals. This will assist the rovers in acquiring and tracking the satellite signals even in very weak-signal environments. The information will also permit the rovers to improve their positional accuracies as is known in the art. This information may be broadcast by modulation of the broadcast ranging signal.

A further advantage of a terrestrial source for ranging information is that it provides better geometry in the rovers' solutions. This is because the rovers are typically attempting to solve for the independent variables of height and receiver clock error, as well as longitude and latitude, from measurements that are mainly in the vertical direction, since the satellites are always above the rovers. The mathematics has difficulty separating the contributions of the height and receiver clock error parameters and, as a result, the estimates of these parameters are inaccurate as compared with those of the horizontal components (latitude and longitude). The clock and height errors are typically two to three times worse than the errors in estimating the horizontal components of the rover's position. The addition of the terrestrial source ranging measurement into the equations for rover position is used to separate the height and clock errors, which provides for more accuracy in position determination.

The clock error can also be independently determined using only TWTT from the base station and, therefore, the clock error can be removed from the list of unknown parameters. With an accurate estimate of the receiver clock error, the rover's height component estimate will become more accurately observable from the satellite signals. This would be extremely useful for applications requiring accurate height determination such as, for example, earth excavation and road paving, and is a distinct advantage in cost savings and ease of use over systems that, for example, determine height using lasers.

In addition the rovers may utilize ranging signals from multiple base stations either in place of or in addition to the satellite signals, to determine position and time. The rovers engage in TWTT with the respective base stations, and the base stations determine and provide to the rovers associated range measurements. The rovers then use the range measurements alone or in conjunction with pseudoranges calculated using the satellite signals to determine rover position and timing, as discussed in more detail below.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
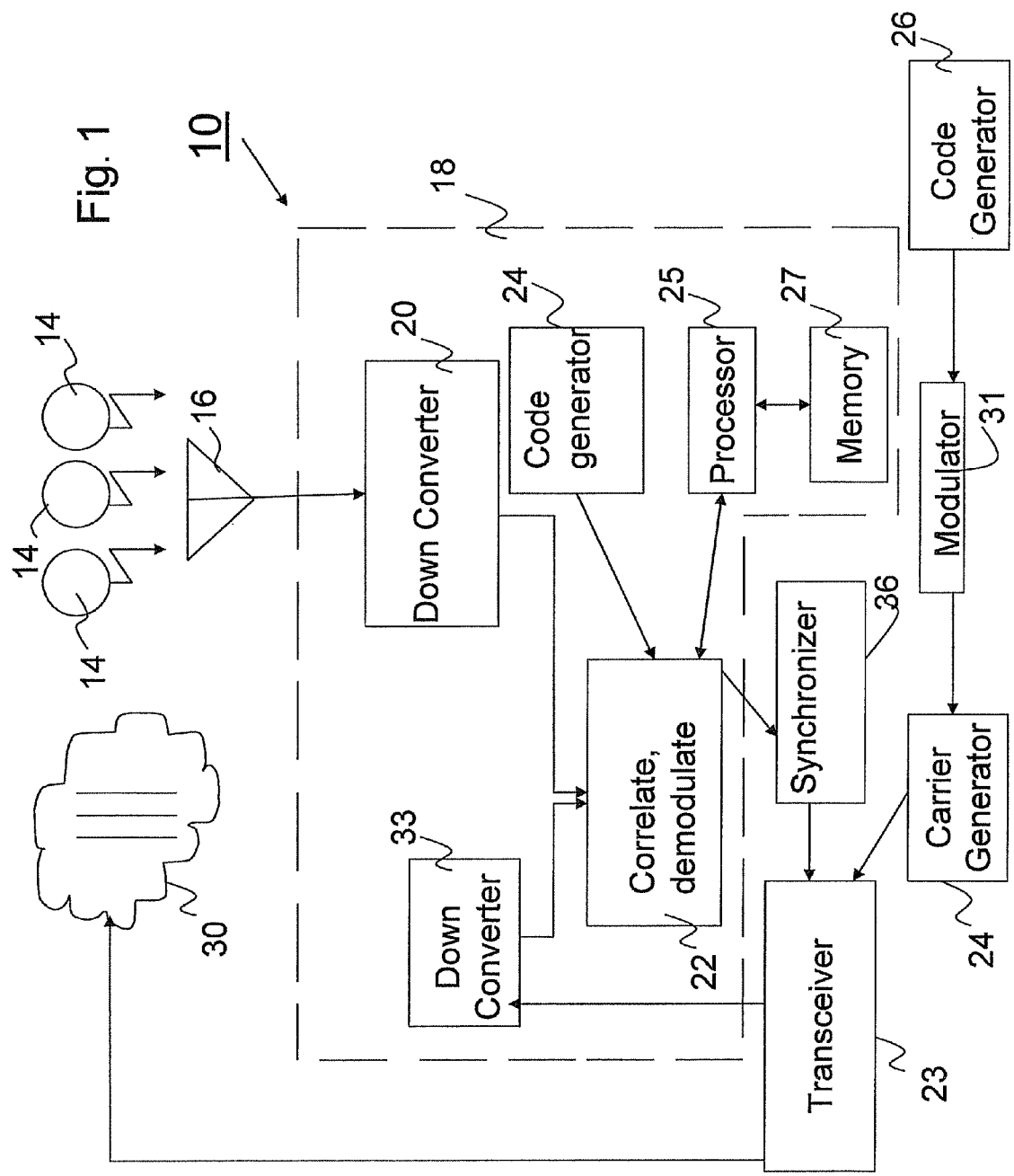
FIG. 1 is a schematic diagram of a base station incorporating the invention.
Figure 2:
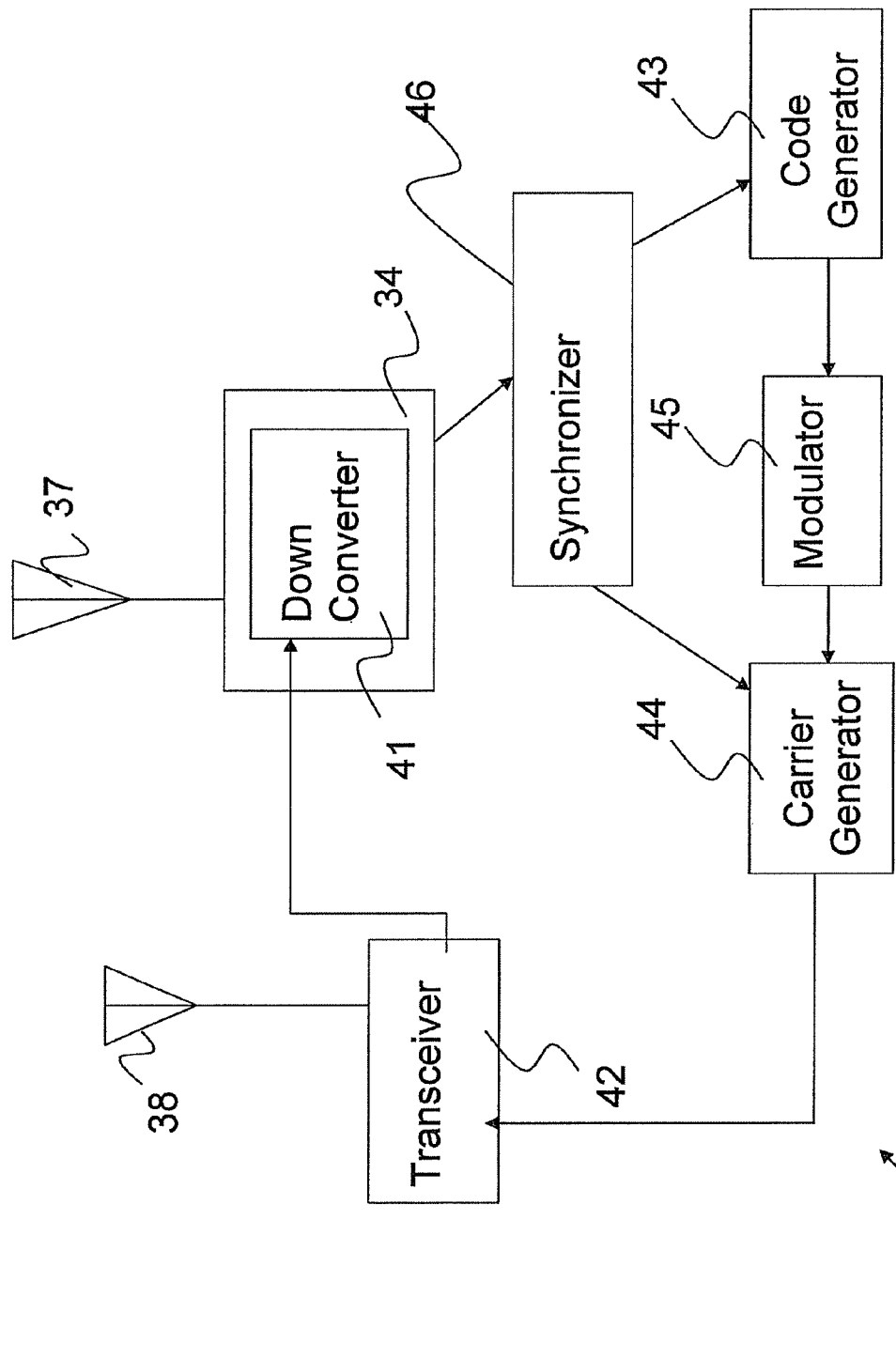
FIG. 2 is a diagram of a rover incorporating the invention.

FIG. 1 depicts a base station, generally indicated at 10, that operates in conjunction with rovers 12, one of which is depicted in FIG. 2. Both the base station and the rovers make use of the ranging signals transmitted by a plurality of Earth-orbiting satellites 14. The base station 10 includes an antenna 16 that picks up the signals from the satellites and passes them to a GNSS receiver 18. The receiver includes a down converter 20 that translates the satellite signals to an intermediate frequency. The down converter 20, a correlation and demodulation unit 22 and a code generator 24 are connected in a well known manner to synchronize carrier phase and the local codes produced by the code generator to the carrier and codes used by the individual satellites 14, and ultimately provide the position of the base station. The base station includes a processor 25 and an associated memory 27 containing software enabling the processor to perform the functions set forth above, as well as other calculations described herein.

The base station 10 also includes a transceiver 23, which transmits RF ranging and, as appropriate, other, signals to one of a group of antennas 30 and receives signals picked up by the antennas 30. The RF carrier for transmissions is generated by a carrier generator 24. A modulator 31 modulates the carrier with a local pseudo-random code that is similar to those transmitted by the satellites 14. The local code is provided by a code generator 26.

Preferably, messages transmitted by the base station use the same bipolar phase shift modulation arrangement used by the satellites. However, this modulation, provided also by the modulator 31, may be applied only to the quadrature phase of the carrier. The information in the messages may include information transmitted by the satellites 14, as well as other information described herein.

The ranging signal transmissions from the base station are synchronized with the satellite system time at the location of the base station. A synchronizer 36, for example, a phase locked loop, is provided between the transceiver 23 and the GNSS receiver 18, to ensure that the time and frequency of the transmissions are aligned with the time and frequency of the received satellite signals. Accordingly, the rovers can utilize the ranging signals transmitted by the base station in exactly the same way they treat the signals from the orbiting satellites. The in-phase version of the carrier is unmodulated by data, and thus, its demodulated code serves as a continuous "pilot" signal to which the rovers' receivers can accurately lock, even in poor signal quality locations.

The signals received by the antennas 30 pass from the antennas through the transceiver 23 to a down converter 33 in the receiver 18. Preferably the output of the converter 33 has the same intermediate frequency as the output of the down converter 20 so as facilitate processing the signals from the down converter by the correlation and demodulation unit 22.

With reference to FIG. 2, the details of a typical rover are exemplified by the depicted rover 12, which includes a GNSS receiver 34 that may have the same construction for GPS reception as the GPS receiver 18 in the base station. The rover also has an antenna 37 for reception of satellite signals and an antenna 38 for communications from and to the base station 10. A separate down converter 41 in the receiver 34 converts the signals received on the antenna 38, by way of a transceiver 42, to the intermediate frequency used in processing signals from the satellites 30. The rover further includes a code generator 43, a carrier generator 44 and a modulator 45, which operate like the generators 26 and 24 and modulator 31 in the base station. Each rover has a unique identification, which may be incorporated in its transmissions to the base station 10. Similarly, the base station may incorporate a rover's identification in its transmissions intended primarily for that rover. As described below, the unique identification for transmissions to the base station may be a pseudo-random code, such that the base station can readily separate the signals received from the respective rovers. Further, the base station may use the code in the received signals for rover clock error and/or rover range determination.

A synchronizer 46, for example, a phase locked loop, is provided between the downconverter 34 and the code and carrier generators 43 and 44 to ensure that the rover transmissions are aligned with the time and frequency of the satellite signals at the rover. This assists in performing time transfer measurements for range determination from the base station and/or TWTT from the base station to determine the clock error. As discussed, the clock error can then be removed from the list of unknown parameters in the position calculations. The synchronizer may also align the downconverter 41 to the reception of the base station ranging transmissions to assist in the reception of the satellite signals, as described above.

Usually each of the rovers 12 receives signals from orbiting satellites sufficient in number to ascertain the rover's position. However, from time to time, obstructions such as foliage, man-made structures, etc., may limit the number of satellite signals that are usable by a rover to fewer than the requisite four signals. The receiver 34 processes the signals from the base station 10 picked up by the antenna 38, along with the satellite signals picked up by the antenna 36. Accordingly, if the rover 12 receives signals from only three satellites instead of the requisite four (or more), the base station 10 provides the fourth ranging signal for position determination.

To cope with a rover's receipt of only two usable satellite signals, we prefer to have the base station 10 determine the range of the rover from the base station and the rover's direction. Specifically, the rover 12 returns the pseudo-random code received from the base station and the base station calculates the range to the rover by measuring the round-trip elapsed time of the code and the associated carrier phase delay. Alternatively, the rover sends a response a predetermined delay after receipt of a periodic time signal broadcast by the base station, and the base station determines the elapsed time of the transmitted code and the associated carrier phase delay in order to calculate the range.

The base station may also use the phase differences of the signals received by the respective ones of the antennas 30, to calculate, in a known manner, the azimuthal direction of the rover. The base station then transmits this information along with the range information to the rover 12. Having its GPS time and the ranges to two satellites from the usable satellite signals, and also the base station's range and known position, the rover then has sufficient data to calculate its position.

In addition to or as part of the ranging signals, the base station broadcasts messages that contain information about the satellites which are in view, as set forth above. By using this information the rovers improve their acquisition and tracking of weak satellite signals and thus enhance the accuracy of the position calculations.

Each rover may also use the base station broadcasts to reduce clock frequency errors, by synchronizing the rover's clock to the broadcast signal, at least until sufficient satellites are visible to train the rover's clocks to the satellite transmissions. As the wavelengths of the base station's transmissions are likely longer than those from the satellites, the Doppler error due to the rover's motion will be less than that from a single satellite, and the rover can more easily train its clock to the timing information in the base station's transmission. With multiple satellites, however, the rover can correct for its motion and create a more accurate clock model using the satellite signals.

To avoid collisions in transmissions from the rovers 12 to the base station 10, a time slot approach (such as TDMA) may be used, since each rover and the base station have sufficiently accurate time estimates. This will also facilitate automatic addition of additional rovers, as they will fill in blank time slots.

Alternatively, a polling procedure can be utilized, in which each rover 12 transmits only in response to a message from the base station 10 identifying that rover. Specifically, the base station transmits to each rover, in turn, a message that includes an identification of the rover. The rover responds and from the response, the base station calculates the information set forth above. In one polling arrangement, the rover transmits its position to the base station. The base station then selects another rover for the foregoing procedure.

The embodiments described above are half-duplex, but it is feasible to make this a full duplex system, so both the base station 10 and the rovers 12 can transmit and receive simultaneously, for example, by using different carrier frequencies. This would increase the complexity of the rovers but would provide a better time transfer capability and provide more signal energy to assist the rovers in acquiring the base station signals in poor signal environments.

It is well understood that the most significant ranging error from a terrestrial based transmission is multipath. Preferably a known multipath mitigation technique will be employed, which can reduce this error. Further, proper antenna design should be used for the base station and rover antennas, as well as proper siting of the base station antenna to attenuate reflections without attenuating the desired signals. As the range from the base station will be used by each rover in computing its position, the rover's antennas for receiving the satellite signals and the base station signals should have the same lateral position. This can be accomplished, for example, by placing a whip antenna for the base station signals in the center of a patch antenna used for the reception of satellite signals. With different frequencies of the base station and satellite signals, there should not be a problem with interference, and the rover will determine ranges to the same location. Otherwise, the rover may determine ranges to different antenna locations and include an offset that compensates for the differences in the antenna locations when determining position.

Rather than having each rover compute its own position it is also possible for it to transmit back to the base station its raw measurement data, and have the base station perform the position calculations. The base station then transmits back to the rover the rover's position. As discussed, the base station may transmit the information on the quadrature phase of the base station ranging signal, or using other transmissions.

With the arrangement described herein, the base station 10 may record the positions of all of the rovers 12. This information is thus available to anyone who wishes to monitor the locations and movements of the rovers.

Whenever a rover 12 is put into, or taken out of, service, an operator can enter that information into the base station 10, so that the base station has an up-to-date list of the rovers to be polled by it.

Figure 3:
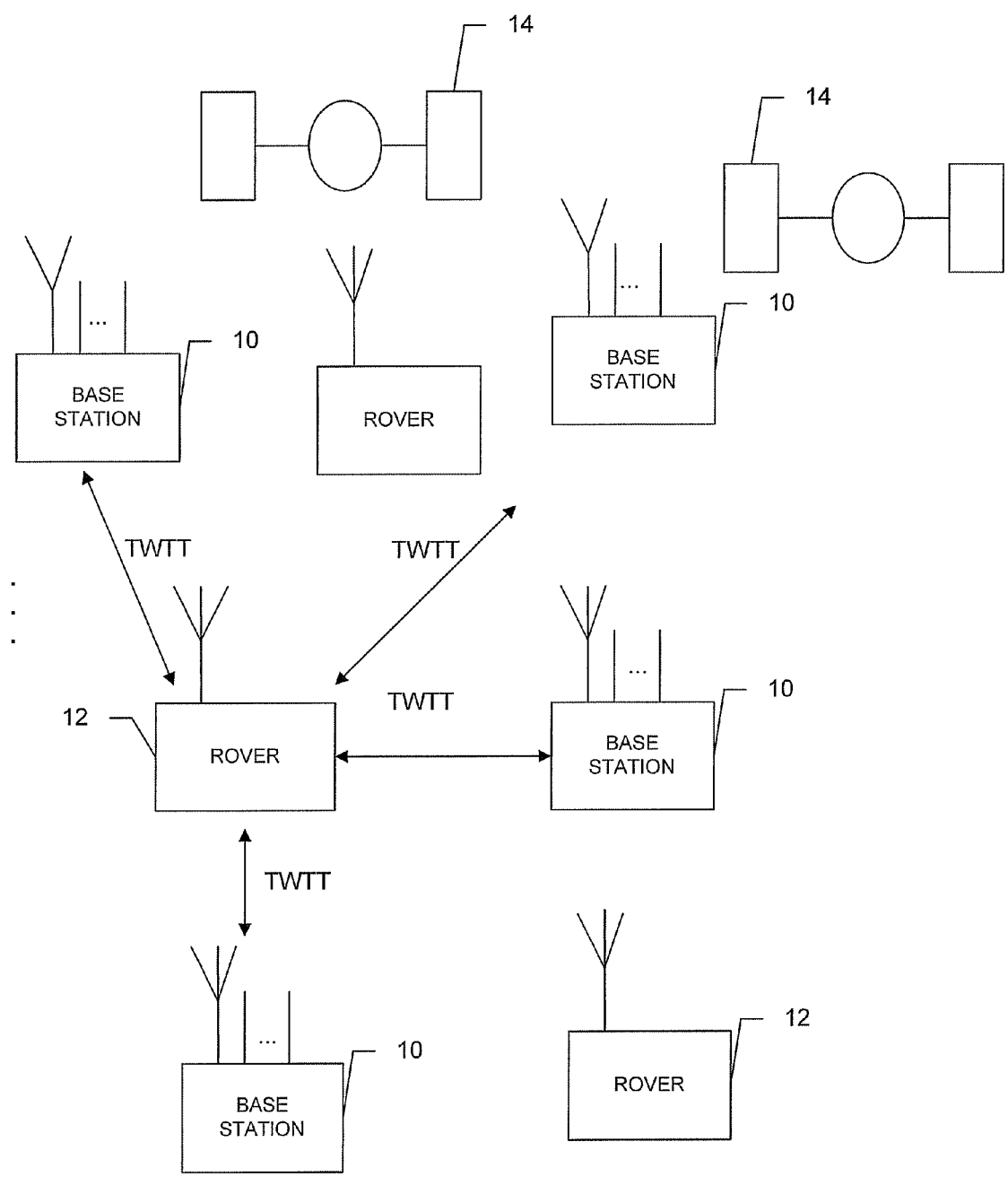
FIG. 3 is a functional block diagram of a system that incorporates multiple base stations.

Referring now to FIG. 3, a plurality of base stations 10 may communicate with a given rover 12 for TWTTs between the rover and multiple base stations, as illustrated in the drawing by the arrows for TWTT. Based on the TWTTs, the ranges between the rover and the respective base stations are determined by the TWTT originator. For example, the base stations may initiate the TWTT and determine corresponding range measurements to the rover based on the time it takes for the respective return signals from the rover. The base stations then provide the range measurements to the rover. Alternatively, the rover may initiate the TWTT and, based on the time it takes for the return signals from the respective base stations, determine the corresponding ranges to the respective base stations. Each TWTT operation between a base station and the rover provides both a range measurement and a clock difference between the participating base station and the rover. As discussed above, each TWTT operation provides the range measurement based on the travel time of the return signal, and also provides the clock difference based on a phase offset of a code in the return signal and/or timing data, such as the time of receipt of the TWTT originating signal, included in the return signal, The rover 12 uses the TWTT range measurements associated with the respective base stations 10 to determine position. The rover may calculate its two or three dimensional position and clock offset using the range measurements and clock differences from at least two or three base stations, without requiring use of the pseudoranges that are calculated using the signals from respective GNSS satellites. Alternatively, the rover may use the range measurements and clock differences associated with certain or all of the base stations in conjunction with the pseudoranges to satellites in view, to determine position and clock offset, or timing.

The base station clocks may, but need not, be synchronous with GNSS timing. If the range measurements between the rover and the base stations are used in conjunction with GNSS signals, however, either the base station clocks are synchronous with GNSS timing or the rovers must determine an associated clock offset between the base station clocks and GNSS timing. To determine the associated clock offset, the rover requires a combination of at least five range and pseudorange measurements, three to determine position, one to determine a clock offset between the rover clock and the GNSS timing and one to determine a clock offset between the rover clock and the base station clocks.

For applications that require horizontal position only, such as navigation applications on a flat surface, such as in a warehouse, the rover may determine its position based on the range measurements between the rover and two base stations, provided that the geometry between the two base stations and the rover is sufficiently good and that one of the possible two solutions can be readily rejected. As discussed above, the azimuthal direction of the rover may be determined by one or both base stations, to further aid in the position determination and could be used to reject one of the two possible solutions in the case of having only two observation range measurements. Once the rover position is determined, the rover may then determine its timing information from the TWTTs and/or the satellite signals. The rover may thus determine its timing using a single satellite signal or TWTT with a single base station, assuming the base station clock is synchronous with a clock of interest that is, in turn, synchronous with GNSS time or UTC time or some other universal or application specific time.

The clocks at the respective base stations 10 also need not be synchronous with one another. If the base station clocks are not synchronous with one another, the navigation position only information can be determined from the TWTT derived range measurements associated with either three base stations, for three dimensional determination, or two base stations, for two dimensional determination, again assuming a sufficiently good geometry. In these applications the ranges to the respective base stations may be calculated to be slightly longer because of latencies in the processing of the signals utilized for TWTT. The associated biases in the range measurements need to be sufficiently small or have been corrected by calibration so as to not adversely affect the accuracy for the navigation only applications.

For TWTT, a given base station 10 communicates point-to-point with the rovers 12, to provide to or receive from the rovers information from which an associated signal travel time can be determined and/or to provide position information to the rover, as discussed above. The TWTT initiating base station may send all of its signals point-to-point, by including rover identification codes in the signals, by sending the signals over various channels or frequencies, or by sending the signals over dedicated wires and so forth. Alternatively, as discussed above, the base station may broadcast ranging signals that can be used by any number of rovers for the TWTT. The broadcast ranging signals include information that uniquely identifies the base stations such as, for example, ranging codes that are unique to the respective base station. The rovers send return information to the base stations point-to-point, however, such that the base stations can use the return signals to determine the ranges to the respective rovers. The base stations may provide the range measurements as point-to-point communications by, for example, including rover identification information in the signals, sending the signals over channels or frequencies associated with the respective rovers, sending the signals during associated time slots or over associated wires, and so forth.

Similarly, a TWTT initiating rover 12 may initiate the TWTT by sending point-to-point communications to the respective base stations 10 or the rover may instead broadcast signals that include a rover identification code.

The base stations and the rovers may communicate using RF signals or wider bases band radio signals, such as WiFi (OFDM) and Ultra Wide Band (UWB) signals, for increased accuracy and a reduction in the adverse effects of multipath signals. In addition, the communication channels between the rovers and the base stations may be used to transmit other data, such as voice, area maps and so forth. The maps may, for example, be used in conjunction with the position information for a display to the user. The position, timing and other data may also be communicated to other rovers and/or to additional users, as appropriate, using the RF or wider base band radio signals.

As discussed above, the base stations 10 may provide aid to the rovers 12 in the form of information relating to the satellites in view. This information together with the ranging and timing information from the base stations allows the rovers to acquire and track satellite signals with enhanced sensitivity. The rovers can thus acquire and track the satellites signals that otherwise would be unavailable and/or obtain GNSS timing in environments that would otherwise prohibit such operations.

As also discussed above, the TWTT operations can be used to control the rover clock frequency, such that the rover clocks operate at a known frequency. This, in turn, allows the rovers to narrow their frequency search bandwidth, which also provides for a further enhancement to the sensitivity of the rovers. The rovers can thus acquire and track the satellite signals more efficiently, both in terms of the speed with which they acquire and track the GNSS signals and also the acquiring and tracking of weaker signals.

From the foregoing it will be apparent that many of the calculations described above can be performed in either the base station or the rovers. Further, the base station is described as using multiple antennas to receive signals transmitted by the rovers but may instead use a single antenna to achieve certain of the advantages described above. In addition, each rover may be associated with a unique identification code that is used by the base station to direct transmissions to that rover and the identification code may differ from the pseudo-random code used by the rover in transmissions to the base station.

What is claimed is:

1. A system for enhancing position determination by a rover, the system comprising:
   A. one or more base stations in known locations, each base station including one or more receivers for receiving and processing return two way time transfer (TWTT) signals from one or more rovers and determining information relating to position and clock differences for the respective rovers based on the time travel of the return TWTT signals, and one or both of a phase offset of a code in the return TWTT signals and timing information included in the return TWTT signals, and
   a transmitter for transmitting one or more TWTT signals, the transmitter further transmitting information related to one or both of the locations of and the timing at the respective one or more rovers;
   B. the one or more rovers, each rover including one or more receivers for receiving the TWTT signals and the information transmitted by the one or more base stations, processing the information transmitted by the one or more base stations and determining position, timing or both, and
   a transmitter for transmitting to the one or more base stations the return TWTT signals that are in response to the receipt of TWTT signals transmitted by the one or more base stations.

2. The system of claim 1 wherein
the one or more base stations determine respective ranges to a given rover, and
the given rover determines position based on the ranges determined by at least two base stations.

3. The system of claim 1 wherein the one or more base stations further receive GNSS signals to determine timing and transmit the TWTT transfer signals in synchronism with the transmission of GNSS ranging signals.

4. The system of claim 3 wherein the rovers further acquires and tracks GNSS signals to determine position, timing or both.

5. The system of claim 4 wherein the rovers determine position, timing or both using pseudoranges from the GNSS satellites and the ranges from the one or more base stations.

6. The system of claim 4 wherein the rovers utilize the timing in the TWTT signals transmitted by the base stations to control clock frequency.

7. The system of claim 6 wherein the rovers further utilize position information from the one or more base stations to acquire and track the GNSS signals.

8. The system of claim 7 wherein the one or more base stations transmit to the rovers information about the satellites in view, information about the characteristics of the satellite signals, or both.

9. The system of claim 1 wherein the one or more base stations transmit signals to initiate the TWTT.

10. The system of claim 9 wherein the one or more base stations transmit the signals to initiate the TWTT by broadcasting ranging signals that uniquely identify the base stations to the rovers.

11. The system of claim 10 wherein
the one or more rovers acquire and track GNSS signals, and
the one or more base stations transmit information about the satellites in view, the characteristics of the satellites, or both, by modulating the information on the ranging signals.

12. The system of claim 11 wherein the rovers determine clock offsets associated with the one or more base stations and with GNSS timing.

13. The system of claim 11 wherein the one or more base station transmit the ranging signals in synchronism with GNSS timing at the respective base stations, and the one or more rovers determine a clock offset associated with the one or more base stations.

14. The system of claim 1 wherein
the one or more base stations further include multiple antennas for receiving the signals transmitted by the one or more rovers, and
the one or more base stations determine azimuthal directions for the respective one or more rovers based on the signals received over the multiple antennas and transmit the direction information to the one or more rovers.

15. The system of claim 1 wherein the one or more rovers initiate the TWTT by transmitting initiating signals, and determine ranges to respective base stations based on the TWTT signals the base stations transmit to the rovers in response to the initiating signals.

16. A ranging base station comprising:
a transmitter for transmitting two way time transfer (TWTT) signals and further transmitting to one or more rovers respective range measurements; and
a receiver for receiving and processing returned TWTT signals from the one or more rovers and determining the range measurements to the respective rovers based on the time travel of the return TWTT signals, and one or both of a phase offset of a code in the return TWTT signals and timing information included in the return TWTT signals.

17. The base station of claim 16 wherein the transmitter transmits TWTT signals that include timing information that the one or more rovers use to control clock frequency.

18. The base station of claim 16 wherein
the receiver further receives and processes GNSS satellite signals, and
the transmitter further transmits the TWTT signals in synchronism with GNSS timing to initiate TWTT with the one or more rovers.

19. The base station of claim 18 wherein the initiating signals are ranging signals and the transmitter broadcasts the ranging signals with codes and carriers synchronized to codes and carriers of received GNSS signals.

20. The base station of claim 19 wherein the transceiver further transmits information about the satellites in view, the characteristics of the satellite signals, or both.

21. The base station of claim 16 wherein the transmitter transmits the signals as one of WiFi signals, Ultra Wideband signals or Radio Frequency signals.

22. A system for enhancing position determination by a rover, the system comprising:
A. a base station in a known location, the base station including:
one or more receivers for receiving and processing return two way time transfer (TWTT) signals from one or more rovers and determining information relating to position, timing, or both, for the respective rovers based on the time travel of the return TWTT signals, and one or both of a phase offset of a code in the return TWTT signals and timing information included in the return TWTT signals, and
a transmitter for transmitting one or more TWTT signals in synchronism with the transmission of GNSS signals by GNSS satellites, the transmitter further transmitting information related to one or both of the locations of and the timing at the respective one or more rovers;
B. the one or more rovers, each rover including
one or more receivers for receiving the TWTT signals and the information transmitted by the base station, processing the information transmitted by the base station and determining position information, timing or both, and a transmitter for transmitting to the base station the return TWTT signals that are in response to the receipt of TWTT signals transmitted by the base station.

23. The system of claim 22 wherein the base station further receives GNSS signals to determine timing.

24. The system of claim 23 wherein the base station determines its known location from the GNSS satellite signals.

25. The system of claim 22 further including one or more additional base stations in known locations, the additional base stations each including:
one or more receivers for receiving and processing return two way time transfer (TWTT) signals from the one or more rovers and determining information relating to position, timing, or both, for the respective rovers, and
a transmitter for transmitting one or more TWTT signals in synchronism with the transmission of GNSS signals by GNSS satellites, the transmitter further transmitting information related to one or both of the locations of and the timing at the respective one or more rovers.

* * * * *